United States Patent
Konagaya

Patent Number: 6,104,473
Date of Patent: *Aug. 15, 2000

[54] IMAGE READING DEVICE

[75] Inventor: Tatsuya Konagaya, Kanagawa, Japan

[73] Assignee: Fuji Photo Film Co., Ltd., Kanagawa, Japan

[*] Notice: This patent issued on a continued prosecution application filed under 37 CFR 1.53(d), and is subject to the twenty year patent term provisions of 35 U.S.C. 154(a)(2).

[21] Appl. No.: 09/172,072

[22] Filed: Oct. 14, 1998

[30] Foreign Application Priority Data

Oct. 14, 1997 [JP] Japan .................................. 9-280944
Dec. 25, 1997 [JP] Japan .................................. 9-356735
Sep. 30, 1998 [JP] Japan ................................. 10-278708

[51] Int. Cl.[7] ...................................................... G03B 27/52
[52] U.S. Cl. ............................................... 355/55; 355/40
[58] Field of Search .................................. 355/58, 55, 63, 355/72, 78, 25, 40, 41; 396/432; 359/310; 399/377; 358/474

[56] References Cited

U.S. PATENT DOCUMENTS

| | | | |
|---|---|---|---|
| 3,531,197 | 9/1970 | King ............................................ | 355/18 |
| 3,649,120 | 3/1972 | Pfeifer et al. .............................. | 355/68 |
| 3,871,765 | 3/1975 | Pramstraller .............................. | 355/18 |
| 4,077,715 | 3/1978 | Greene ....................................... | 355/57 |
| 4,093,379 | 6/1978 | Weiner ....................................... | 355/77 |
| 4,099,866 | 7/1978 | Jones et al. ............................... | 355/58 |
| 4,107,714 | 8/1978 | Raab .......................................... | 354/196 |
| 4,165,934 | 8/1979 | Zimmet ...................................... | 355/55 |
| 4,397,544 | 8/1983 | Yajima et al. ............................. | 355/58 |
| 4,910,601 | 3/1990 | Gerlach ...................................... | 358/474 |
| 5,055,872 | 10/1991 | Sakaida et al. ........................... | 355/55 |
| 5,574,577 | 11/1996 | Wally, Jr. et al. ........................ | 358/487 |

*Primary Examiner*—Russell Adams
*Assistant Examiner*—Hung Henry Nguyen
*Attorney, Agent, or Firm*—Sughrue, Mion, Zinn, Macpeak & Seas, PLLC

[57] ABSTRACT

Without using a zoom lens, an image reading device in which image data of an image whose magnification has been changed can be obtained appropriately is provided at a low price. This image recording device moves and adjusts variable focal length lenses, on the one hand, and a photographic element (66), on the other hand, relative to one another, and separately. Accordingly, an original image whose magnification is changed by using variable focal length lenses is formed on the photographing element (66) by moving and adjusting the variable focal length lenses and the photographic element (66) integrally. As a result, image data can be read.

7 Claims, 12 Drawing Sheets

IMAGE READING DEVICE

BACKGROUND OF THE INVENTION

1. Field of the Invention

The present invention relates to an image reading device for reading image data using an optical electric conversion element.

2. Description of the Related Art

Generally, an image reading device is used for a photographic printer which exposes an image which is recorded on a photographic film such as a negative film or the like onto a photosensitive material such as a printing paper or the like. In such a photographic printer, it is necessary to read information for image correctly.

Further, in the same manner as the above-description, an image reading device for reading various information about a photographic film is used for an image processing device in which an image which is recorded on a photographic film is read by a scanner, an image is recorded on a recording material by using image data obtained by this reading, and the image is displayed on a display.

The image reading device which is used as described above is structured as shown in FIG. 12. A film carrier 14, which stores therein a film 12 on which an image is recorded, is set on a table 10 of the device body. Light emitted from a light source 16 is diffused through a diffusion box 18. Thereafter, light is transmitted through the film 12. The light transmitted through the film 12 is converged by moving and adjusting a zoom lens 20. An image whose magnification is changed at a predetermined magnification is formed on the image reading surface of a CCD scanner 24 which is mounted to a case 22 of the device body, and is converted to electric signals, and these signals are thereby sent to an image processing circuit portion 26.

In such an image reading device, because an extremely expensive zoom lens has been used to obtain image data of an image whose magnification has been changed, there has been a problem in that the price of the image reading device becomes high.

SUMMARY OF THE INVENTION

In view of the aforementioned fact, it is an object of the present invention to provide an inexpensive image reading device in which image data of an image whose magnification is changed can be obtained appropriately without using a zoom lens.

In accordance with first and second aspects of the present invention, there is provided an image reading device in which an original document placed on a stand and having an image recorded thereon is read by a photographing element, wherein a photographing unit having a photographing element and a fixed focus lens is able to move integrally, and one of the photographing element and the fixed focus lenses is able to move relative to the other.

By structuring the present invention as described above, an image reading device in which an image whose magnification has been changed can be read appropriately can be obtained, using an inexpensive fixed focus lens.

When it is desired to change the magnification of an image to be read, it is carried out by moving the photographing unit and by moving the photographing element, on the one hand, and the fixed focus lenses, on the other hand, relative to one another.

In accordance with a third aspect of the present invention, there is provided an image reading device in which an original document placed on a stand and having an image recorded thereon is read by a photographing element, comprising: a photographing unit which receivingly supports the photographing element and the variable focal length lenses such that the photographing element, on the one hand, and the variable focal length lenses, on the other hand, are able to move relative to one another; moving and adjusting means which is mounted to the photographing unit so as to move and adjust the photographing element, on the one hand, and the variable focal length lenses, on the other hand, relative to one another; and conveying means which moves the photographing unit having the photographing element and the variable focal length lenses with respect to the original document on the stand.

By structuring the present invention as described above, an image reading device in which an image whose magnification has been changed can be read appropriately can be obtained, using an inexpensive variable focal length lens.

When it is desired to change the magnification of an image to be read, it is carried out by moving the photographing unit and by moving the photographing element, on the one hand and the variable focal length lenses, on the other hand, relative to one another.

In accordance with fourth to sixth aspects of the present invention, there is provided an image reading device according to the third aspect of the present invention, wherein the moving and adjusting means is one of a cam mechanism, a screw feeding mechanism, and a belt conveying mechanism for moving and adjusting one of the photographing element and the variable focal length lenses relative to the other.

By structuring the present invention as described above, an image reading device in which an image whose magnification has been changed can be read appropriately can be obtained, using a cheap mechanism such as the cam mechanism, the screw feeding mechanism, or the belt conveying mechanism for moving and adjusting one of an inexpensive variable focal length lens and a photographing element, relative to the other. Further, when it is desired to change the magnification of an image to be read, it is carried out by moving the photographing unit by the conveying means, and by moving the photographing element, on the one hand, and the variable focal length lens, on the other hand, relative to one another, by the cam mechanism, the screw feeding mechanism, or the belt conveying mechanism.

In accordance with seventh to tenth aspects of the present invention, there is provided an image reading device according to the third to sixth aspects of the present invention, wherein the conveying means comprises: the slide guide which includes the shafts and the linear bearings, and which receivingly supports the photographing unit having the photographing element and the variable focal length lenses such that the photographing unit is freely slidable; and one of the screw feeding mechanism, the gear feeding mechanism, the belt conveying mechanism, and the cam feeding mechanism for moving the photographing unit.

By structuring the present invention as described above, the photographing element and the variable focal length lens are moved and adjusted relatively by the moving and adjusting means. The photographing unit is receivingly supported by the shafts and the linear bearings so as to slide freely. By using one of the screw feeding mechanism, the belt conveying mechanism, and the cam feeding mechanism for moving the photographing unit, an image whose magnification has been changed can be read appropriately can be obtained.

When it is desired to change the magnification of an image to be read, it is carried out by moving the photographing unit by the screw feeding mechanism, the gear feeding mechanism, the belt conveying mechanism, or the cam feeding mechanism, and by moving the photographing element, on the one hand, and the variable focal length lenses, on the other hand, relative to one another by the moving and adjusting means.

DESCRIPTION OF THE PREFERRED EMBODIMENTS

With reference to the drawings, a detailed description of an embodiment of an image reading device according to the present invention will be given, hereinafter. Further, hereinafter, a digital lab system 30 in which the image reading device according to the present embodiment forms a part of the digital lab system 30 will be explained.

Figure 9:
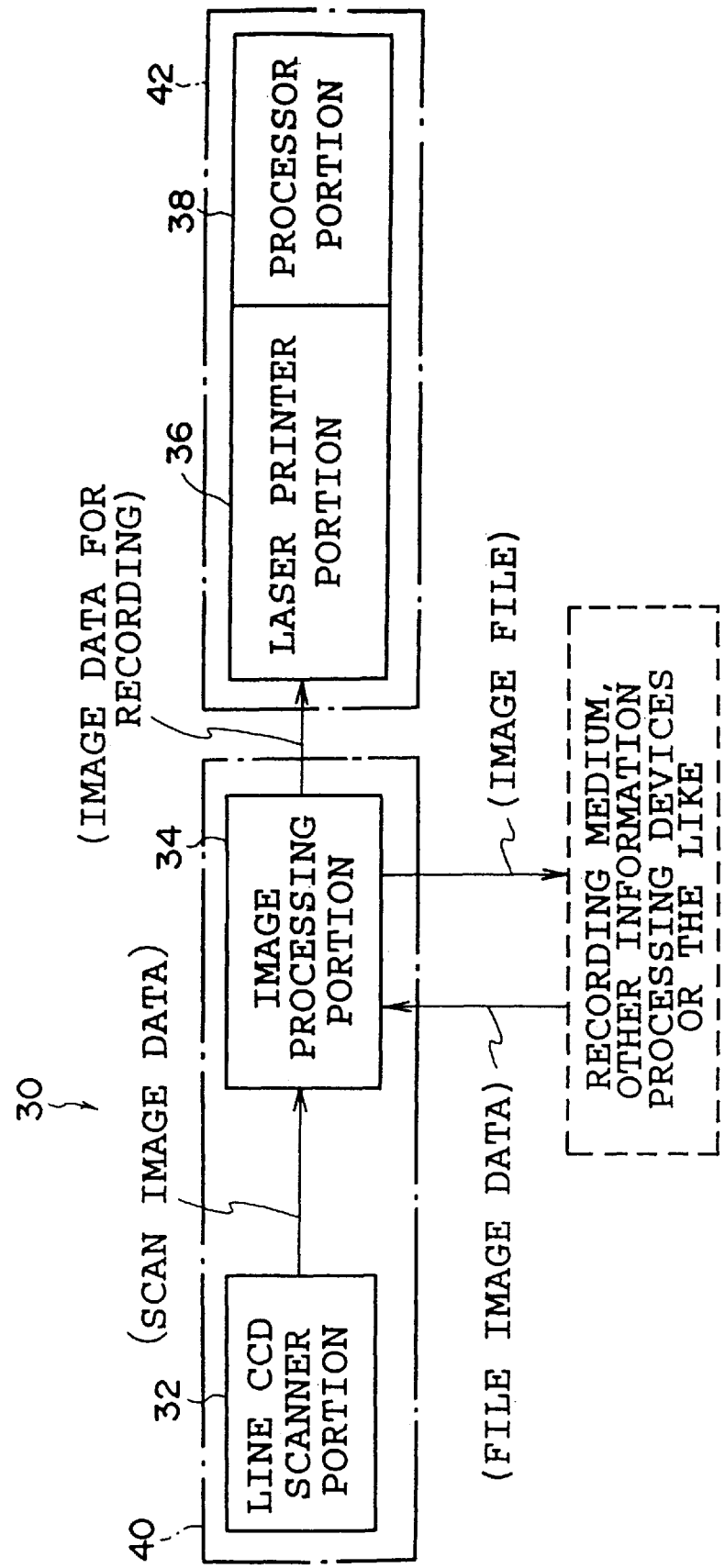
FIG. 9 is a schematic block view of a digital lab system which is formed by the image reading device according to the present embodiment.
Figure 10:
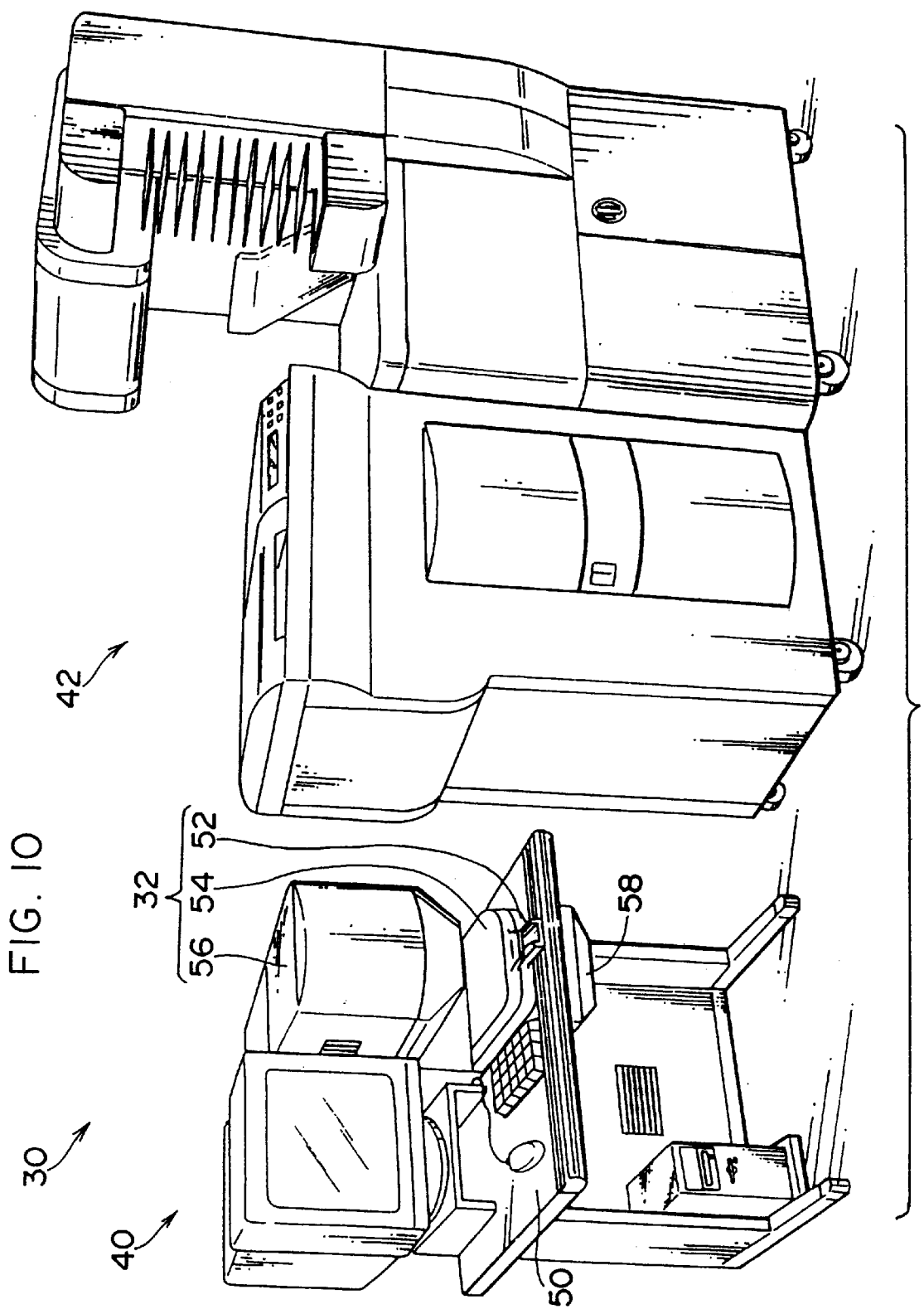
FIG. 10 is a perspective view illustrating an external view of the digital lab system which is formed by the image reading device according to the present embodiment.

A schematic structure of the digital lab system 30 according to the present embodiment is shown in FIG. 9, and the external view of the digital lab system 30 is shown in FIG. 10. As shown in FIG. 9, the digital lab system 30 comprises a line CCD scanner portion 32 as an image reading device, an image processing portion 34, a laser printer portion 36 and a processor portion 38. Further, as shown in FIG. 10, the line CCD scanner portion 32 and the image processing portion 34 are provided at an input portion 40, and the laser printer portion 36 and the processor portion 38 are provided at an output portion 42.

The line CCD scanner portion 32 is used to read a film image which is the original of an image and which is recorded on a photographic film such as a negative film or a reversal film. A line CCD (photographing element) in which three rows of a photometric sensor for each of R, G, and B colors are lined up is provided at the line CCD scanner portion 32, and the film image is read by this line CCD, and image data for each of the three R, G, and B colors is outputted.

The image processing portion 34 executes various image processes such as correction and the like on image data inputted from the line CCD scanner portion 32, and the processed data is outputted to the laser printer portion 36, as image data for recording. Further, the image processing portion 34 can output image data, on which the aforementioned image processing has been executed, as an image file, to the external portion (for example, image data is outputted to a storage medium such as a memory card or is transmitted to other information processing apparatuses via communication lines).

The laser printer portion 36 has a laser light source for irradiating a laser beam of R, G or B, and irradiates a laser beam, which is modulated in accordance with image data for recording inputted from the image processing portion 34, on a printing paper, and records an image on the printing paper by scanning and exposure. Further, the processor portion 38 applies each of a coloring process, a developing process, a bleaching and a fixing process, and a rinsing process to the printing paper, on which an image has been recorded via scanning and exposure at the laser printer portion 36. Accordingly, an image is formed on the printing paper.

The line CCD scanner portion 32, which serves as the image reading device and forms a part of the input portion 40 which is used in the above-described digital lab system 30, reads an image of a photographic film, which is set on a film carrier 54 which is mounted on a carrier stand 52 provided at a table 50 of the main body of the device in the input portion 40, by a photographing portion 56, which is disposed at the upper portion of the table 50.

A light source (not shown), and a light modulating filter and a diffusion box which are accommodated in a lower case 58, are disposed beneath this carrier stand 52. After light from the light source has been modulated by a light modulating filter, light is diffused within the diffusion box, is transmitted through a photographic film within the film carrier 54 which is integrally fixed to the carrier stand 52, and is projected onto the photographing portion 56.

Figure 1:
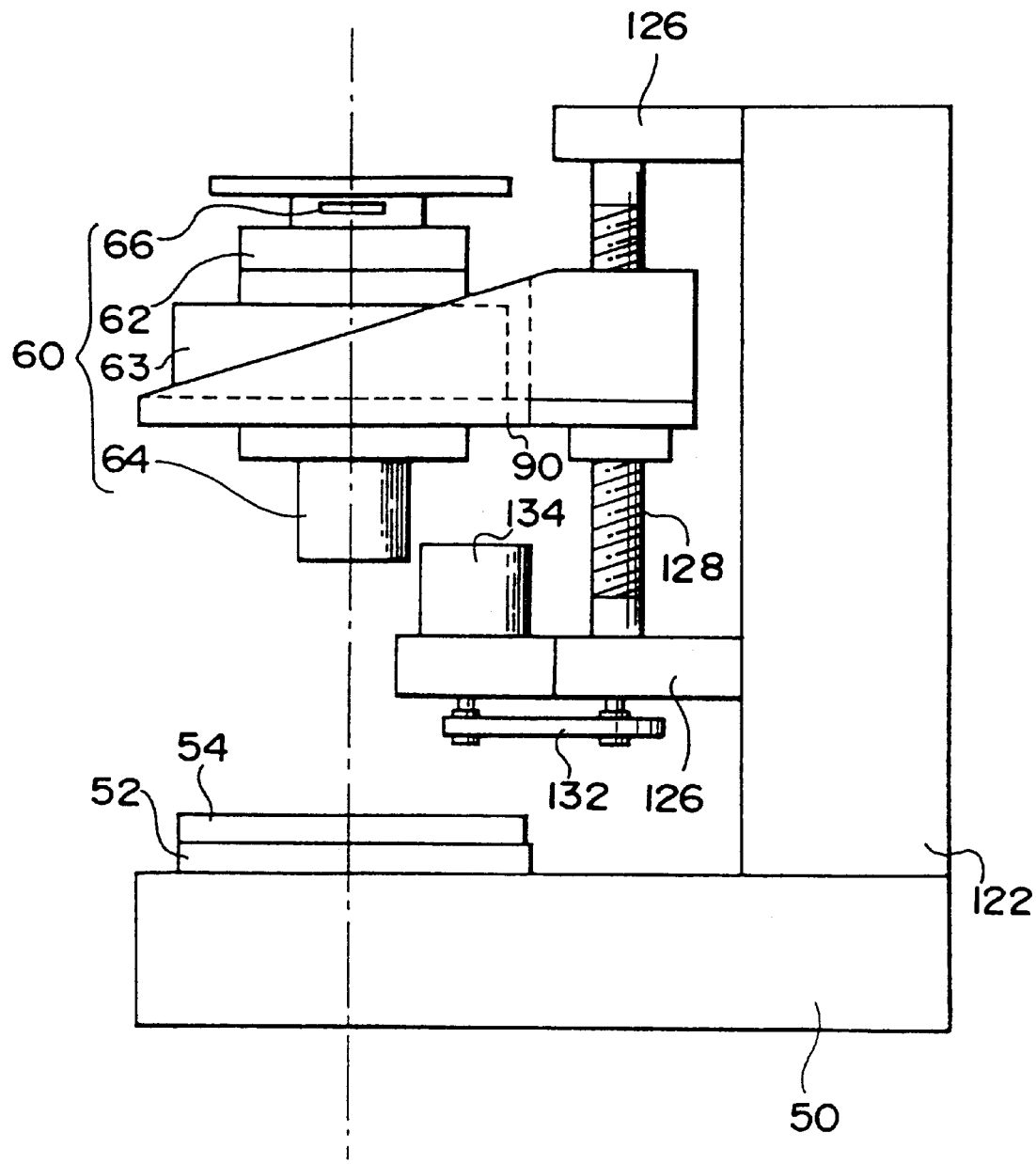
FIG. 1 is a schematic side view illustrating an image reading device according to the present embodiment.

As shown in FIG. 1, a photographing unit 60 and a conveying means are installed in a casing of the photographing portion 56. The conveying means is mounted on a stand, and moves and adjusts the photographing unit 60 with respect to a photographic film which is an original document having an image formed thereon within the film carrier 54, in order to adjust the magnification of the image.

This photographing unit 60 is formed by a CCD unit 62 and a lens unit 64 which are integrated with each other. A line CCD scanner 66 is disposed within the CCD unit 62 and a black shutter (not shown) is also provided at the CCD unit 62. The CCD unit 62 is fixed to a base unit 63 which is formed integrally with the lower portion thereof such that it is mounted on the top surface of a photographing frame 90.

Figure 3:
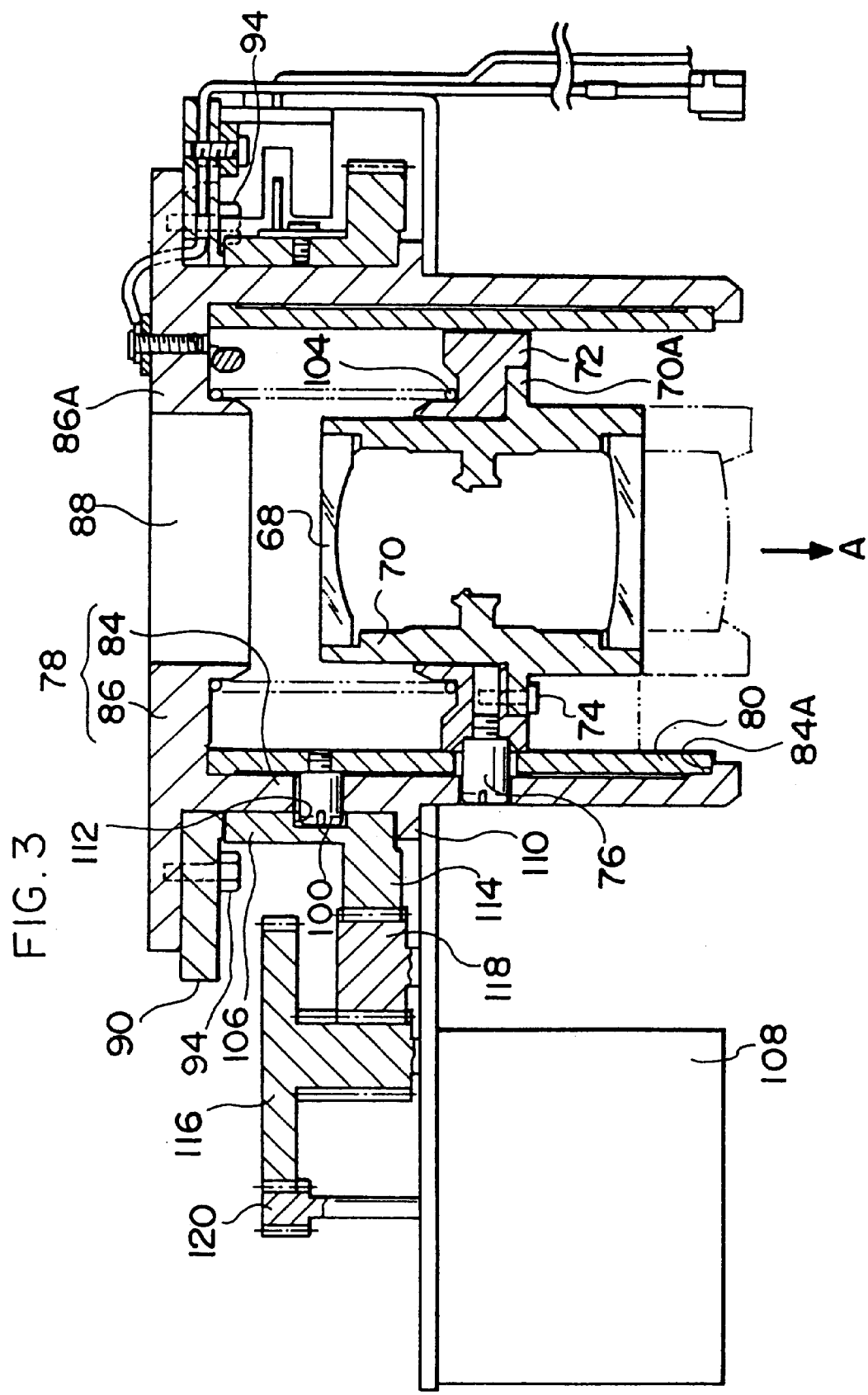
FIG. 3 is a cross sectional view focusing on a lens unit portion of the image reading device according to the present embodiment.

As a moving and adjusting means which is mounted to the photographing unit 60 so as to move and adjust the photographing element, on the one hand, and fixed focus lenses, on the other hand, relative to one another, as shown in FIG. 3, a lens moving mechanism which is a cam mechanism is formed at the lens unit 64, and moves and adjusts the box body 70 to which fixed focus lenses 68 are mounted. This box body 70 is formed in a cylindrical shape, and lenses 68 are fixed to both end opening portions thereof, respectively. A flange 70A is integrated with the box body 70 at a height direction central portion of the outer circumferential surface of the box body 70, and an annular fixing member 72 is fastened to this flange 70A by a screw 74. Further, a follower 76 is fastened to the fixing member 72. The follower 76 has a column shaped head portion, and a screw axis is formed integrally therewith and protrudes from the base end portion thereof. Accordingly, the follower 76 is fastened to the fixing member 72 by screwing and inserting the screw axis into a screw hole of the fixing member 72.

The lens moving mechanism for moving and adjusting the box body 70 thus structured in a direction of the light axis passing through the lenses 68, carries out a relative moving operation upon a supporting cam member 78 and a cam member to be driven 80 using an adjusting and driving mechanism, and thereby moves and adjusts the box body 70 together with this relative movement.

Figure 6:
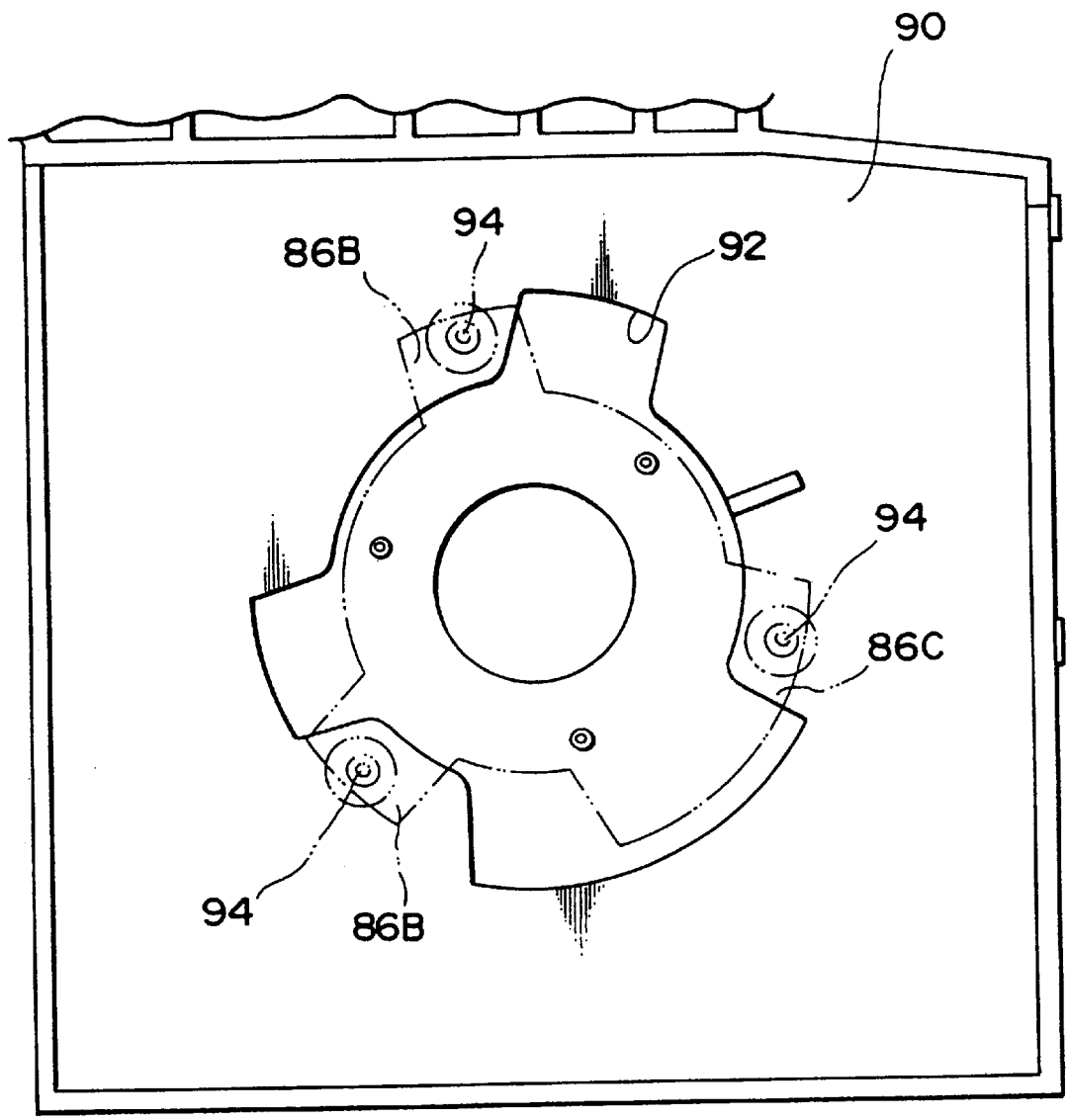
FIG. 6 is a plan view of mounted portions of a supporting cam member to a photographing frame of the image reading device according to the present embodiment.

The supporting cam member 78 has a supporting plate portion 86 which is formed integrally therewith at one end opening portion of a cylinder portion 84. As shown in FIGS. 3 and 6, the supporting plate portion 86 comprises: an annular bottom plate portion 86A having an opening 88 formed at the center thereof; two small pieces 86B which are the same shape and are formed in a flange shape so as to extend from the bottom plate portion 86A in a radial direction thereof; and a single large piece 86C which is larger than these small pieces 86B. This opening 88 is formed in an circular shape whose inner diameter is substantially the same as each of the lenses 68 for passing the luminous flux transmitting the lenses 68 therethrough. A tubular opening edge portion extends from the circumferential portion of the opening 88 to the cylinder portion 84 side.

These two small pieces 86B and large piece 86C are used to mount and fix the supporting cam member 78 onto the top surface of the photographing frame 90 by a so-called bayonet structure, and the sizes of the two small pieces 86B and the large piece 86C are different in order to align their mounting positions easily. Further, as shown in FIG. 6, a through opening 92, which is slightly larger than the external configuration of the plane of the supporting plate member 86 and is analogous thereto, is formed at a predetermined position of the photographing frame 90. When the supporting cam member 78 is mounted on the top surface of the photographing frame 90, the supporting plate member 86 is inserted into the opening of the through opening 92 in a state in which they are corresponded to each other. By rotating the small pieces 86B and the large piece 86C so as to slide on the top surface of the photographing frame 90, as shown by a virtual line in FIG. 6, the through opening 92, the small pieces 86B and the large piece 86C are set in a state in which the through opening 92, the small pieces 86B and the large piece 86C are not displaced from one another, and the small pieces 86B and the large piece 86C do not slip out of the through opening 92. The small pieces 86B and the large piece 86C are respectively fastened to the photographing frame 90 by passing mounting screws 94 through the photographing frame 90 from the lower surface side thereof. In this way, because an operation of fastening the mounting screws to the photographing frame 90 from the lower surface side thereof can be carried out, even in a state in which the base unit 63 has already been installed at the top surface side of the photographing frame 90, a mounting or dismounting operation of the supporting cam member 78 can be carried out. Further, with the above-described bayonet structure, since the supporting cam member 78 is mounted to the photographing frame 90, the mounting operation can be carried out at one touch and without making an error in the mounting direction. Moreover, because the supporting cam member 78 is mounted on the top surface of the photographing frame 90, and the base unit 63 is also mounted thereon, after all, the supporting cam member 78 and the base unit 63 are mounted on the same plane. As a result, it is possible to improve the accuracy of the device without increasing an accumulating difference in a tilt on the assembling structure. Namely, in a case in which the base unit 63 is mounted on the top surface of the photographing frame 90 and the supporting cam member 78 is mounted on the lower surface thereof, it takes much time and work to dispose the upper surface and the lower surface, of the photographing frame 90 in parallel with each other because it must be processed with high accuracy. However, if both of the supporting cam member 78 and the base unit 63 are mounted on the same top surface of the photographing frame 90, it is possible to reduce the number of works for the processing and improve the accuracy.

Figure 4:
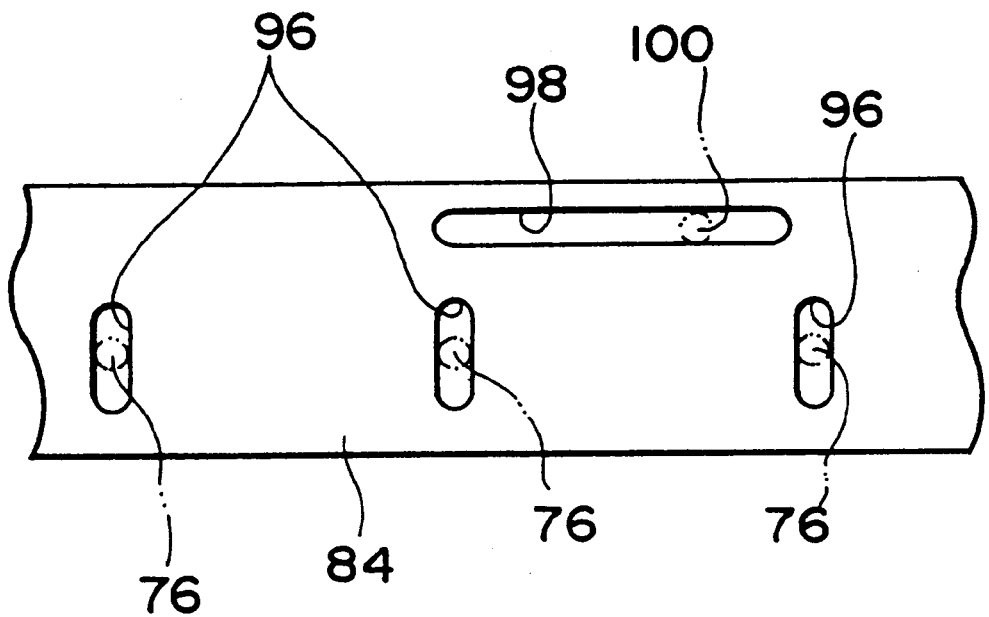
FIG. 4 is a development view focusing on a support cam member of the image reading device according to the present embodiment.

As shown in development views in FIGS. 3 and 4, guide holes 96, each of which is an elongated circular through hole and extends vertically along the direction of the central axis of a cylindrical portion, and a plurality of insert holes 98, each of which extends in the circumferential direction along a plane surface orthogonal to the central axis of this cylinder, are formed on the cylindrical circumferential surface portion of the supporting cam member 78.

As shown in FIG. 3, a cylindrical cam member to be driven 80 is disposed inside of the cylinder of the supporting cam member 78 so as to be rotatable around the central axis, while sliding and contacting the inner circumferential surface of the supporting cam member 78. Namely, the cam member to be driven 80 is disposed in a state in which the lower end opening circumferential portion thereof is mounted on a supporting circumferential portion 84A, which extends from the inner circumferential opening portion of the cylinder portion 84 of the supporting cam member 78 in a state of a ring shaped stand, so as to be slidable freely, and is receivingly supported without falling off from the supporting cam member 78.

A connecting pin 100 is fastened to a position which corresponds to each of the insert holes 98 on the outer circumferential surface of the cam member to be driven 80. The connecting pin 100 has a head portion which is formed in a column shape, and a screw axis protrudes from the base end portion of the head portion. The connecting pin 100 is fastened to the cam member to be driven 80 by screwing and inserting the screw axis into the screw hole of the cam member to be driven 80, and the head portion of the connecting pin 100 extends to the outer circumferential surface side of the supporting cam member 78 through the insert hole 98.

Figure 5:
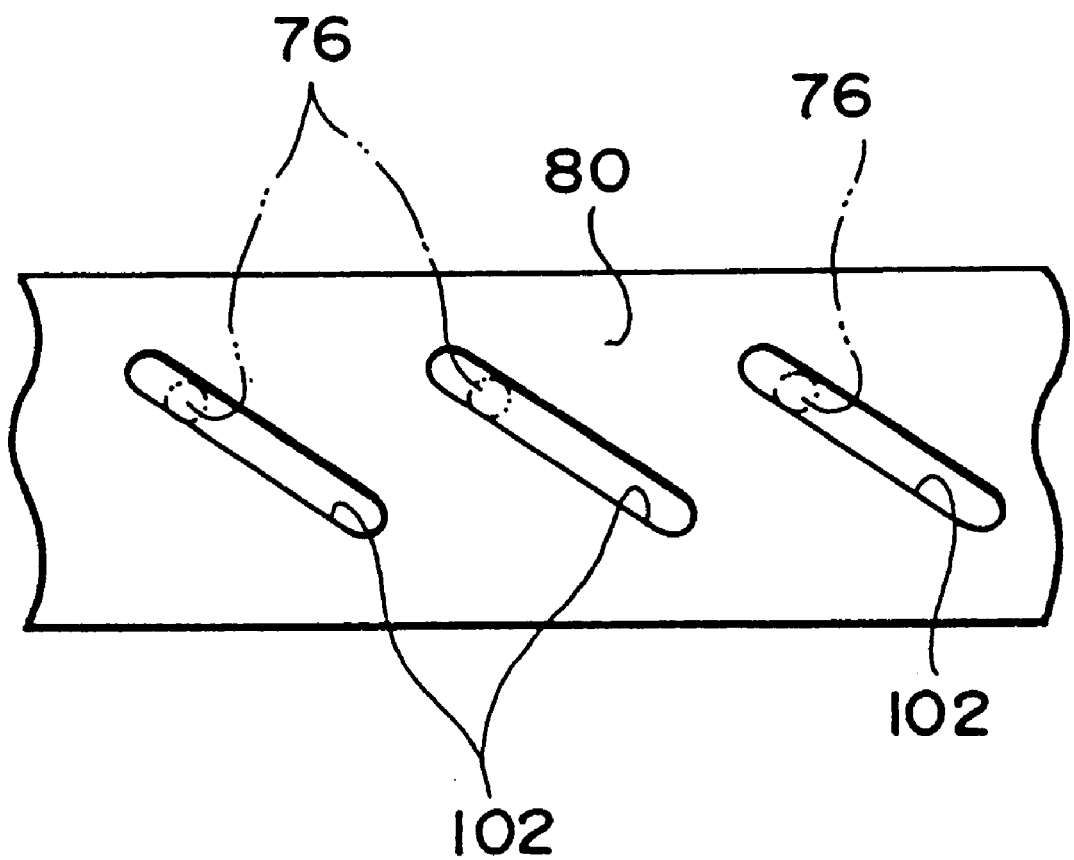
FIG. 5 is a development view focusing a cam member to be moved of the image reading device according to the present embodiment.

As shown in FIG. 3 and FIG. 5 in development views, cam holes for movement 102, each of which is formed diagonally and is an elongated circular through hole, are formed at the circumferential side portion of the cam member to be driven 80 so as to correspond to the guide holes 96 of the supporting cam member 78.

As shown in FIG. 3, the box body 70 to which the lenses 68 are attached is disposed inside of the cylinder portion of the cam portion to be driven 80 so as to slide freely on the outer circumferential surface portion of the fixing member 72 of the box body 70. The follower 76 protruding from the box body 70 is mounted in such a manner that it is inserted into the cam holes for movement 102 of the cam member to be driven 80, and the guide holes 96 of the supporting cam member 78 at the same time.

A compression coil spring 104 is installed between the inside portion of the cylinder opening portion of the opening 88 of the supporting cam member 78 and the fixing member 72. And the fixing member 72 is urged in the lower end opening direction (direction arrow A in FIG. 3) of the cylinder portion 84 of the supporting cam member 78.

In the lens moving mechanism which is structured as described above, when the cam member to be driven 80 rotates relatively to the support cam member 78 by moving the connecting pin 100 along the insert hole 98, the follower 76 is moved by moving the guide holes 96 and the cam holes for movement 102, relatively. Accordingly, the box body 70 which is formed integrally with the follower 76 is moved in the direction of the light axis of the lenses 68 (the direction of the central axis which is concentric with the supporting cam member 78 and the cam member to be driven 80). Further, during this movement, the lenses 68 move together with the box body 70 without rotating, with respect to the supporting cam member 78.

A description of an adjusting and driving mechanism in the moving and adjusting means which operates the lens moving mechanism which is structured as described above will be given hereinafter. The adjusting and driving mechanism drives an operation member 106 for moving the connecting pin 100 by a step motor 108 via a deceleration gear mechanism.

The operation member 106 is formed in a cylindrical shape, is fitted onto the outer circumferential portion of the cylinder portion 84 of the supporting cam member 78 so as to slide freely thereon, and is mounted around the cylinder portion 84 so as to rotate freely therearound along a flange 110 protruding from the outer circumferential portion of the cylinder portion 84. Further, the connecting pin 100 is inserted into a through hole 112, without clearance. The through hole 112 is formed at the operation member 106 at a predetermined position. And the operation member 106 and the cam member to be driven 80 rotate integrally around the cylinder portion 84.

A gear to be driven 114 as an external tooth gear is provided integrally with the operation member 106 at the outer circumferential portion of the operation member 106. The gear to be driven 114 is driven together with a driving gear 120 of the step motor 108 via a first deceleration gear 116 and a second deceleration gear 118. Namely, a large diameter spur gear of the first deceleration gear 116 meshes with the driving gear 120 of the step motor 108. The second deceleration gear 118 which is an intermediate diameter spur gear meshes with a small diameter gear which is formed concentrically and integrally with the large diameter spur gear. This second deceleration gear 118 meshes with the gear to be driven 114. Accordingly, the rotational driving force of the step motor 108 is decelerated and is transmitted to the gear to be driven 114, and the operation member 106 is thereby rotated slowly. Further, as the above described moving and adjusting means which is mounted to the photographing unit for moving and adjusting the photographing element, on the one hand, and the variable focal length lenses, on the other hand, relative to one another, instead of the cam mechanism which has been shown in the above-described embodiment, it is possible to use a screw feeding mechanism which moves nut portions along the screw groove which is formed at the rotation axis. Also, a belt conveying mechanism which transmits driving force via a belt as a medium can be used.

Figure 2:
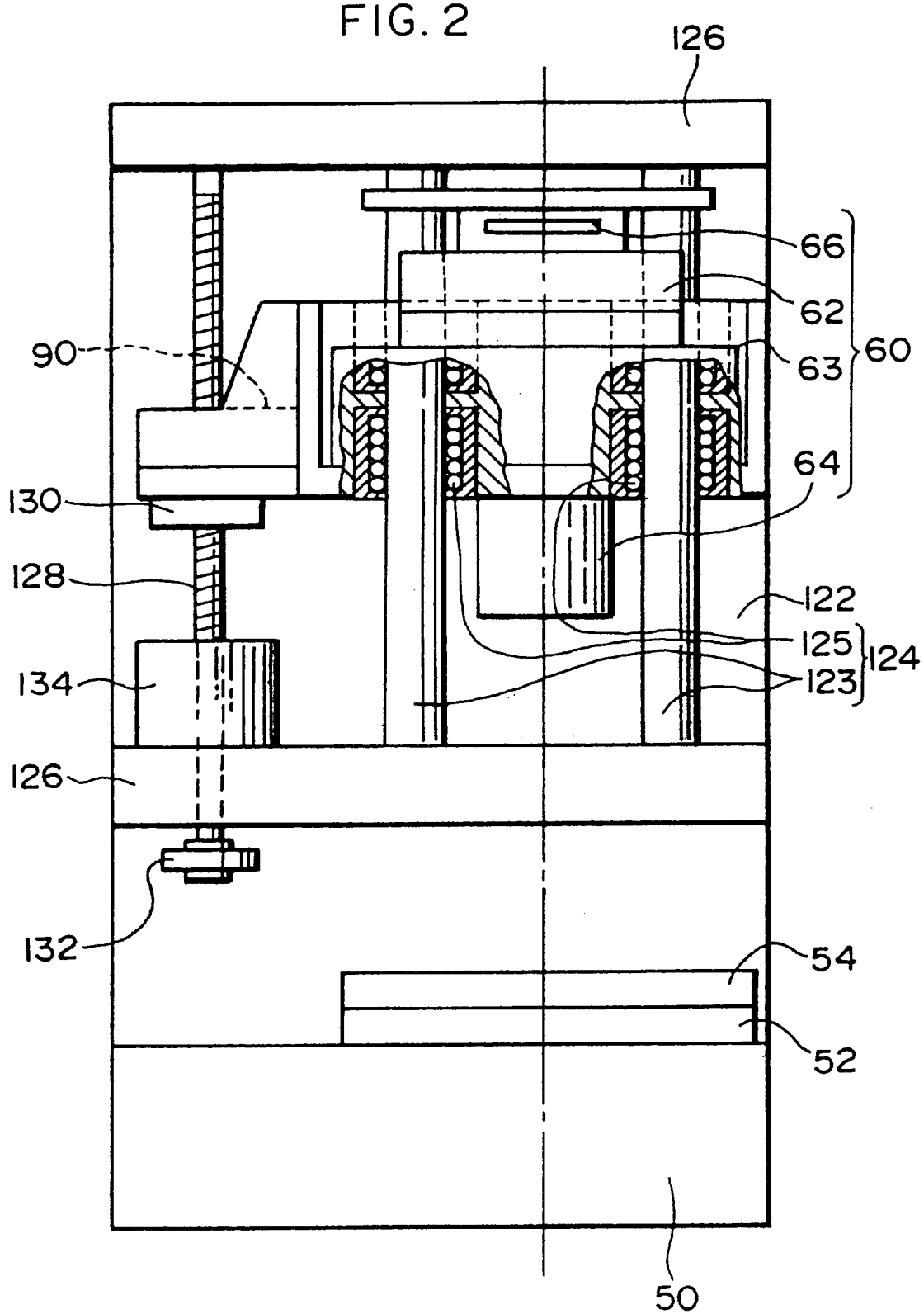
FIG. 2 is a schematic front view illustrating the image reading device according to the present embodiment.

The photographing unit 60 is fixed to the photographing frame 90 in the driving mechanism as the conveying mechanism. This driving mechanism moves the whole body of the photographing unit 60 in a substantially vertical direction. For this reason, the photographing frame 90 is mounted to a mounting frame 122 fixed to the table 50 so as to slide freely in a substantially vertical direction by a slide guide 124. The slide guide 124 comprises a pair of shafts 123 which are shown in FIG. 2, and linear bearings 125 each of which is a ball circulation linear bearing which carries out a linear motion on each of the pair of the shafts 123 by rolling and circulating the balls within each of the linear bearings 125.

By using the slide guide 124, because the clearances between the shafts 123 and the linear bearings 125 can be made smaller, during the slide of the linear bearings 125, it is possible to reduce a so-called play, the frictional resistance, and the operating force. Since the shafts 123 and the linear bearings 125 can be manufactured inexpensively, the product can be provided at a moderate price.

A ball and screw feeding mechanism, which has a groove surface on which steel balls can roll at a portion where a screw axis and nuts oppose to each other, and in which the screw axis and the nuts can operate through the steel balls, is mounted between the mounting frame 122 and the photographing frame 90 so that the photographing frame 90 can be moved. In this way, if the ball and screw feeding mechanism is used, the frictional resistance during the feeding operation can be minimized, the loading can be reduced, and the feeding operation can be carried out with high accuracy. Further, because the ball and screw feeding mechanism can be manufactured at a low cost, the product can be provided inexpensively.

In this ball and screw feeding mechanism, a screw axis 128 is provided so as to be rotatable between two supporting plates 126 which protrude from the mounting frame 122. A nut portion (not shown) is mounted to the intermediate portion of the screw axis 128 via the steel balls. The nut portion is fed in the axial direction of the screw axis 128 through a screw groove of the screw axis 128 due to an normal or inverse rotation of the screw axis 128.

One end portion of the screw axis 128 is connected to an output shaft of a step motor 134 via a belt conveying mechanism 132. The belt conveying mechanism 132 is structured by entraining an endless belt such as a timing belt or the like between a pulley provided at the one end portion of the screw axis 128 and a pulley provided at the output shaft of the step motor 134. The one end portion of the screw axis 128 rotates, drives, and controls the step motor 134 in response to control signals from a control portion (not shown), rotates the screw axis 128 at a predetermined angle, and thereby moves, adjusts, and operates the photographing unit 60 which is formed integrally with the photographing frame 90 in a substantially vertical direction. Moreover, the above-described conveying means is formed by the screw feeding mechanism. However, provided that the conveying means has a structure which moves and adjusts the photographing unit 60 substantially vertically, a gear feeding mechanism which transmits a driving force using a gear, a belt conveying mechanism which transmits a driving force using a belt, or a cam feeding mechanism which transmits a driving force using a cam by moving with the cam mechanism can be used.

Figure 7:
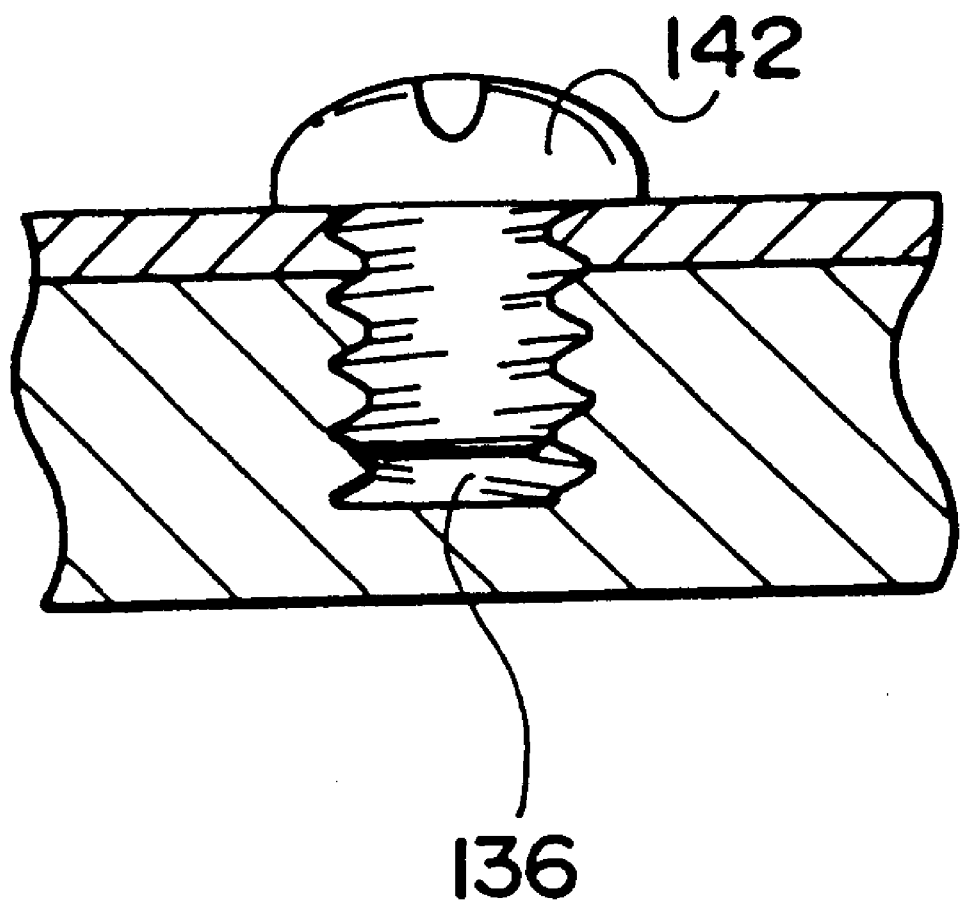
FIG. 7 is a longitudinal sectional view illustrating a screw fastening structure which is used for the image reading device according to the present embodiment.
Figure 8:
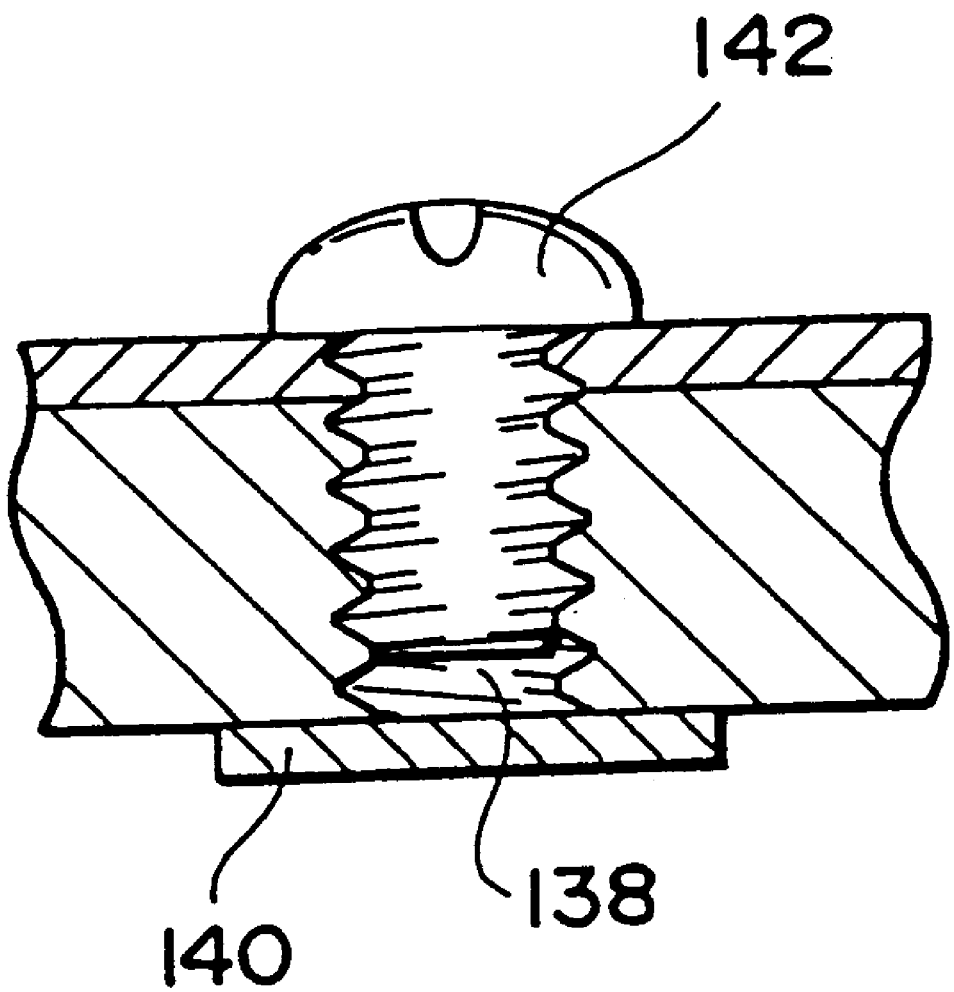
FIG. 8 is a longitudinal sectional view illustrating the screw fastening structure which is used for the image reading device according to the present embodiment.

For example, preferably, a screw fastening structure for fastening each of the parts used in the image reading device is formed as a bottoming screw hole 136 which does not pierce a member as shown in FIG. 7 or it is formed such that the open end portion of the screw hole 138 which pierces the member is closed by a cap body 140 as shown in FIG. 8. By structuring the screw fastening structure as described above, when a screw 142 is screwed into the screw hole 136 or 138, even if waste such as dust or the like is created, it does not escape from the screw hole 136 or 138 to the outside. Accordingly, the deposition of the aforementioned waste on the surfaces of lenses or the CCD and the projection of the shades of the waste onto an image can be prevented.

In the above-described structure, the structure for moving the photographing frame 90 vertically is guided by the two shafts 123 which extend in parallel with each other, of the slide guide 124. However, it can be structured as will be described below. Namely, the photographing frame 90 may be guided by one of the shafts 123 so as to slide freely on the linear bearing 125. And it can be guided by the other shaft 123 in such a manner that the other shaft 123 is nipped by one bearing which is fixed to the base unit 63 and the other bearing which is supported by the base unit 63 and whose position can be changed by resiliently deforming a spring. When the parallelism between a pair of the shafts 123 in the slide guide 124 is imperfect, it can be absorbed by the above-described structure. With this structure, because the linear bearing 125 may be provided only at one of the shafts 123, the manufacture of the image reading device is inexpensive.

Figure 11:
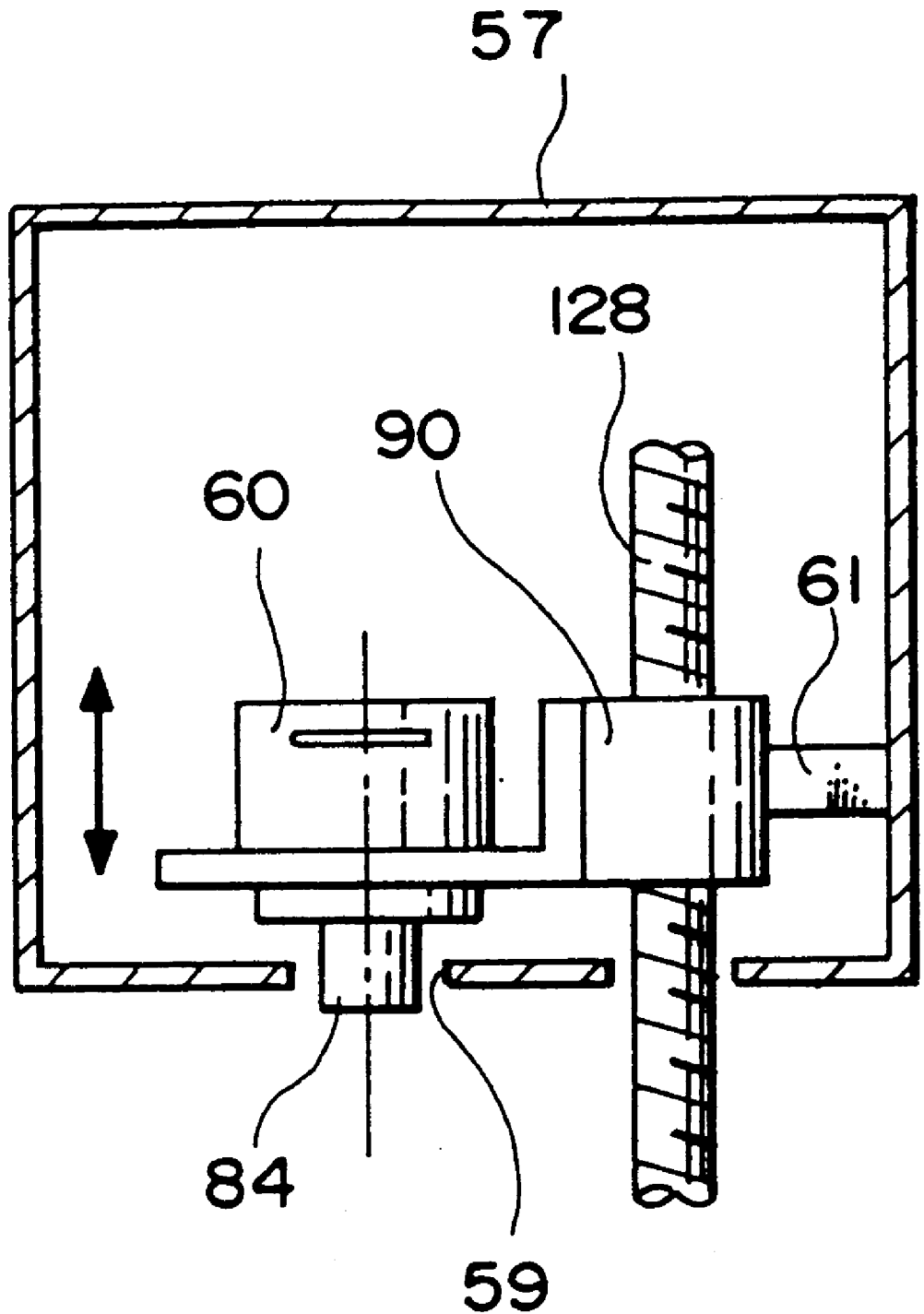
FIG. 11 is a schematic cross sectional view illustrating an example of another structure of the image reading device according to the present embodiment.
Figure 12:
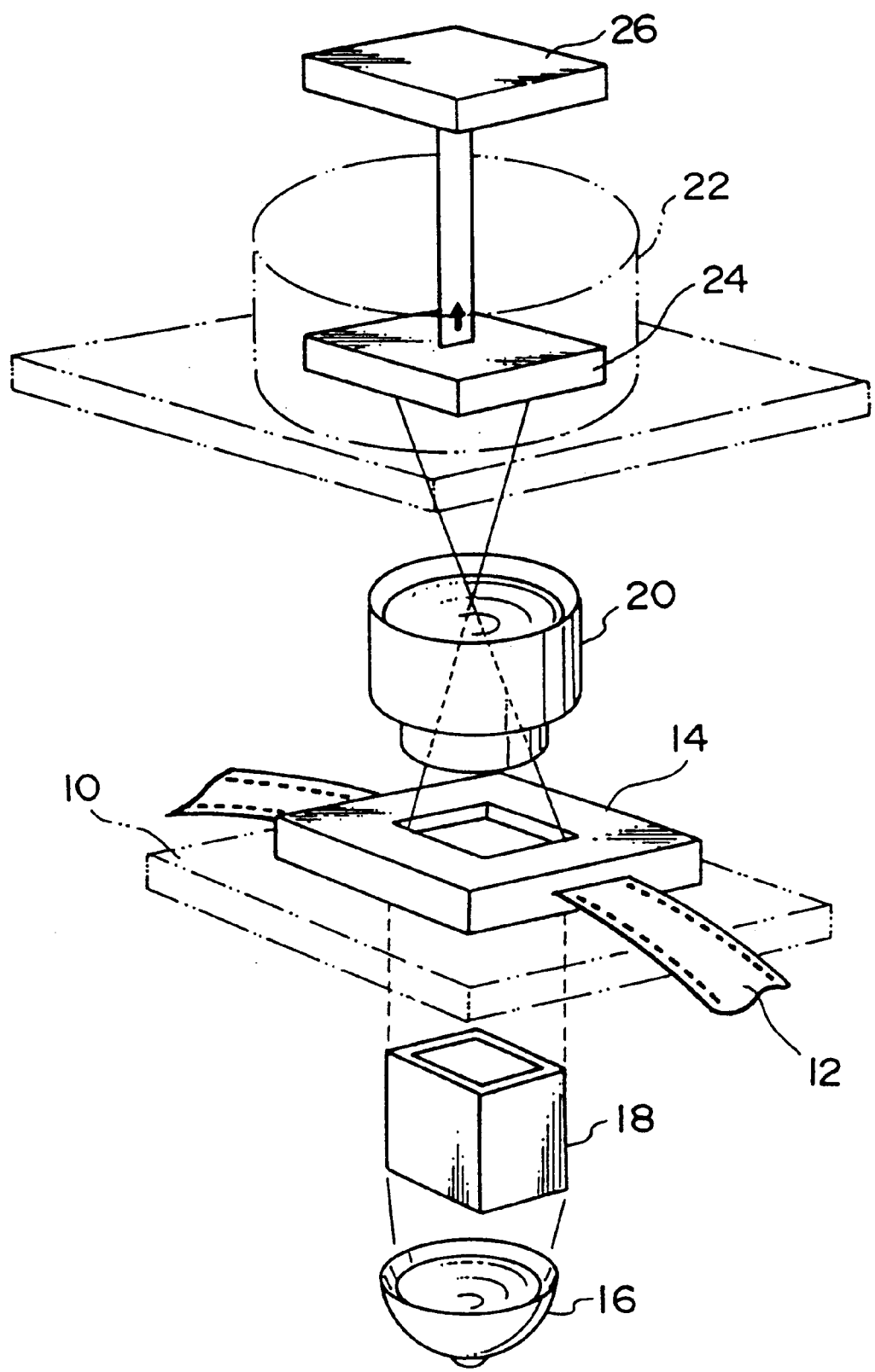
FIG. 12 is a schematic structural explanatory view illustrating a schematic structure of a conventional image reading device.

As shown in FIG. 11, if a case 57 in the photographing section is connected to the photographing frame 90 at a joint 61 such that the case 57 moves vertically in synchronous with the vertical movement of the photographing frame 90, the gap between the outer circumferential portion of the cylinder portion 84 of the supporting cam member 78, and the opening 59 through which the cylinder portion 84 passes, of the case 57 of the photographing portion is made narrower. Accordingly, the operational interference between the external circumferential portion of the cylinder portion 84 and the opening 59 of the case 57, and the entry of waste from the gap can be prevented.

Operation and movement of the image reading device according to the present embodiment will be given hereinafter. In this image reading device, the film carrier 54 is placed on the film carrier stand 52 on the table 50 of the device body. The luminous flux from an unillustrated light source is transmitted through a film. The light transmitted from the luminous flux is converged on the fixed focus lenses 68 in the lens unit 64. An image is formed on the line CCD scanner 66, the image is scanned by the line CCD scanner 66 by conveying the film, and image data is thereby read.

The magnification of an image formed on the line CCD scanner 66 is changed and adjusted at a predetermined magnification as needed. This adjustment is such that the fixed focus lens 68 is moved and adjusted via a cam mechanism by driving and controlling the step motor 108 by an unillustrated control portion. At the same time, by driving and controlling the step motor 134, the whole body of the photographing unit 60 including the lens unit 64 and the line CCD scanner 66 is moved and adjusted.

Previously to this control operation, at the control portion, in accordance with the degree of changing the magnification, it is desired to carry out an appropriate control operation by judging whether to carry out an optical magnification change or an electronic magnification change. Namely, when a magnification change is carried out between an ordinary large (L) size and a panoramic size, image data read by the line CCD scanner 66 is processed by an electronic circuitry so as to change the magnification of the image.

By doing this, the time during which each of the step motors 108 and 134 is caused to operate can be saved, and the processing efficiency can be improved.

Further, when an image is extended from an ordinary L size or a panoramic size to an extra large size (8×10 inch size, A4 size, 10×12 inch size or the like) or when the image is reduced, as described above, each of the step motors 108 and 134 is controlled, and the optical magnification change is carried out.

By processing as described above, even if the magnification of the image is largely changed, the image quality cannot be deteriorated. For example, in a case in which this large magnification change is carried out by an electronic magnification change, the ratio of the number of the input pixels to the number of the output pixels exceeds 100%, and the image quality may deteriorate. However, the above-described optical magnification change prevents this. Moreover, when the magnification is changed to a large degree, it is a particular case, and a processing rate is apart from a problem.

In the image reading device according to the present embodiment, in order to move the photographing unit 60 vertically, the slide guide 124, the screw axis 128, and the nut portions are used. For example, if the shafts 123 in the slide guide 124 are made from inexpensive iron, when the image reading device is switched on, the photographing frame 90 is moved vertically at a full length, causing the control portion to carry out a sequence control automatically. Preferably, the lubricating oil of the linear bearings 125 is uniformly coated on the shafts 123 of the slide guide 124 so that they do not rust.

When the image reading device is switched off, in order to prevent the photographing frame 90 which is formed integrally with the photographing unit 60, and the box body 70 used for the lenses 68 from falling naturally to a position at the lowest limit, the photographing frame 90 and the box body 70 are suspended by a constant force spring mechanism so as to prevent the fall of them. Or it is preferable that the fall of the photographing frame 90 and the box body 70 is prevented by attaching a motor detent to each of the step motors 108 and 134.

In the image reading device according to the present embodiment, because the bayonet structure, in which a mechanism portion which operates the lenses 68 or the like by the cam mechanism is provided at the supporting cam member 78, is used and mounted to the photographing frame 90, after the line CCD scanner 66 has been mounted to the photographing frame 90, the supporting cam member 78 can be mounted to the photographing frame 90 from the lower portion thereof. Further, the moving and adjusting of the mounting position of the supporting cam member 78 having the bayonet structure, to the frame 90 in a horizontal direction facilitates the adjustment of the light axis with respect to the line CCD scanner 66.

In the image reading device according to the present invention, as an optical system of the lens unit 64 in the photographing unit 60, the one which is formed by fixed focus lenses has been described. However, variable focal length lenses can be employed. These variable focal length lenses form the optical system by a plurality of lenses. When the distance between the lenses are changed by moving a portion or all portions of the lenses along the light axis, the focal length is changed, and the size of the image is thereby changed. Namely, this is a type of lens whose focal surface is moved by the focal length being changed.

As described above, in accordance with the image reading device according to the present invention, the device moves and adjusts the photographing element, on the one hand, and the variable focal length lenses, on the other hand, relative to one another, and separately. The device moves and adjusts the variable focal length lenses and the photographing element integrally. Accordingly, the magnification of an original image is changed by the variable focal length lenses and the image whose magnification has been changed is formed on the photographing element, and image data can be read. As a result, there is an excellent effect that the product can be obtained at a moderate cost by using an inexpensive variable focal length lens, as compared to the use of an expensive zoom lens.

Further, the image reading device has a simple structure of moving and adjusting the variable focal length lenses which are made compact and light-weight, on the one hand, and the photographing element, on the other hand, relative to one another, by the moving and adjusting means. The photographing unit having the variable focal length lenses and the photographing element is receivingly supported by the slide guide of the conveying means such that the photographing unit is freely slidable. This photographing unit is moved and adjusted by the feeding mechanism having a simple structure of reliably operating the photographing unit. In the case in which image data of an original image formed on the photographing element, at a predetermined magnification, by the variable focal length lenses, there is a sufficient effect that the product can be provided at a low price by using an inexpensive variable focal length lens, an inexpensive moving and adjusting means, and an inexpensive conveying means, as compared to a high priced zoom lens.

While the embodiments of the present invention, as herein disclosed constitute a preferred form, it is to be understood that other forms might be adopted.

What is claimed is:

1. An image reading device in which an original document placed on a stand and having an image recorded thereon is read by a photographing element, comprising:
    a photographing unit which receivingly supports said photographing element and fixed focus lenses such that said photographing element, on the one hand, and said fixed focus lenses, on the other hand, are able to move relative to one another;
    a moving and adjusting mechanism which is mounted to said photographing unit so as to move and adjust said photographing element, on the one hand, and said fixed focus lenses, on the other hand, relative to one another, in a vertical direction with respect to a surface of the original document on the stand in said photographing unit;
    a conveying mechanism which moves and adjusts said photographing unit having said photographing element and said fixed focus lenses, vertically with respect to the surface of the original document on the stand; and
    a controller which commands both said moving and adjusting mechanism and said conveying mechanism such that said original document is read by varying magnification.

2. An image reading device according to claim 1, wherein said moving and adjusting mechanism further comprises a first power driver, and said conveying mechanism further comprises a second power driver; and wherein said controller commands said first power driver and said second power driver.

3. An image reading device in which an original document placed on a stand and having an image recorded thereon is read by a photographing element, comprising:
    a cam mechanism which moves one of said photographing element, on the one hand, and fixed focus lenses, on the other hand, relative to the other;
    a slide guide which includes shafts and linear bearings, and which receivingly supports a photographing unit having said fixed focus lenses and said photographing element such that said photographing unit is freely slidable; and
    a screw feeding mechanism which moves said photographing unit.

4. An image reading device in which an original document placed on a stand and having an image recorded thereon is read by a photographing element, comprising:
    a photographing unit which receivingly supports said photographing element and variable focal length lenses such that said photographing element, on the one hand, and said variable focal length lenses, on the other hand, are able to move relative to one another;
    a moving and adjusting mechanism which is mounted to said photographing unit so as to move and adjust said photographing element, on the one hand, and variable focal length lenses, on the other hand, relative to one another in a vertical direction with respect to a surface of the original document on the stand in said photographing unit;
    a conveying mechanism which moves and adjusts said photographing unit having said photographing element and said variable focal length lenses, vertically with respect to the surface of the original document on the stand; and
    a controller which commands both of said moving and adjusting mechanism such that said original document is read by varying magnification.

5. An image reading device according to claim 4, wherein said moving and adjusting mechanism is a cam mechanism for moving and adjusting one of said photographing element, on the one hand, and said variable focal length lenses, on the other hand, relative to the other.

6. An image reading device according to claim 3 wherein said moving and adjusting mechanism further comprises a first power driver, and said conveying mechanism further comprises a second power driver; and wherein said controller commands said first power driver and said second power driver.

7. An image reading device in which an original document placed on a stand and having an image recorded thereon is read by a photographing element, comprising:
    a cam mechanism which moves one of said photographing element, on the one hand, and variable focal length lenses, on the other hand, relative to the other;
    a slide guide which includes shafts and linear bearings, and which receivingly supports a photographing unit having said variable focal length lenses and said photographing element such that said photographing unit is freely slidable; and
    a screw feeding mechanism which moves said photographing unit.

* * * * *